US011930352B2

(12) United States Patent
Bataille

(10) Patent No.: US 11,930,352 B2
(45) Date of Patent: Mar. 12, 2024

(54) METHOD AND DEVICE FOR PROCESSING VIRTUAL-REALITY ENVIRONMENT DATA

(71) Applicant: ORANGE, Issy les Moulineaux (FR)

(72) Inventor: Guillaume Bataille, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 255 days.

(21) Appl. No.: 17/436,343

(22) PCT Filed: Mar. 5, 2020

(86) PCT No.: PCT/FR2020/050438
§ 371 (c)(1),
(2) Date: Sep. 3, 2021

(87) PCT Pub. No.: WO2020/178527
PCT Pub. Date: Sep. 10, 2020

(65) Prior Publication Data
US 2022/0191637 A1 Jun. 16, 2022

(30) Foreign Application Priority Data
Mar. 5, 2019 (FR) ...................................... 1902242

(51) Int. Cl.
H04S 7/00 (2006.01)
G06F 3/01 (2006.01)
H04S 1/00 (2006.01)
(52) U.S. Cl.
CPC ............. H04S 7/303 (2013.01); G06F 3/011 (2013.01); H04S 1/007 (2013.01); H04S 2400/11 (2013.01)

(58) Field of Classification Search
CPC ...... H04S 7/303; H04S 1/007; H04S 2400/11; G06F 3/011; G06F 3/017; G06F 3/167
USPC .................................... 381/303, 310; 700/94
See application file for complete search history.

(56) References Cited

U.S. PATENT DOCUMENTS

| 5,768,393 | A | * | 6/1998 | Mukojima | ............... | H04S 1/007 463/32 |
| 8,646,910 | B1 | * | 2/2014 | Schenkein | ............... | A61H 5/00 351/203 |
| 11,507,203 | B1 | * | 11/2022 | Bosworth | ............... | G06F 3/012 |
| 11,647,354 | B2 | * | 5/2023 | Redmann | ................ | G06F 3/011 381/303 |
| 2012/0157203 | A1 | | 6/2012 | Latta et al. | | |
| 2015/0062000 | A1 | * | 3/2015 | Saito | ....................... | G06F 3/017 345/156 |

(Continued)

OTHER PUBLICATIONS

English translation of the Written Opinion of the International Searching Authority dated Aug. 18, 2020 for corresponding International Application No. PCT/FR2020/050438, filed Mar. 5, 2020.

(Continued)

Primary Examiner — Xu Mei
(74) Attorney, Agent, or Firm — David D. Brush; Westman, Champlin & Koehler, P.A.

(57) ABSTRACT

A method and corresponding device for processing virtual-reality environment data, wherein at least one part of the body of a user of the virtual-reality environment is detected. The part of the body of the user is capable of interacting with at least one object of the virtual-reality environment. At least one sound signal is generated according to the detection of the at least one part of the body of the user of the virtual-reality environment.

14 Claims, 3 Drawing Sheets

(56) References Cited

U.S. PATENT DOCUMENTS

Figure 1:

2015/0352437 A1* 12/2015 Koseki ................ A63F 13/5255
 463/31
2016/0378294 A1 12/2016 Wright et al.

OTHER PUBLICATIONS

International Search Report dated Aug. 3, 2020 for corresponding International Application No. PCT/FR2020/050438, Mar. 5, 2020.
Written Opinion of the International Searching Authority dated Aug. 3, 2020 for corresponding International Application No. PCT/FR2020/050438, filed Mar. 5, 2020.

* cited by examiner

METHOD AND DEVICE FOR PROCESSING VIRTUAL-REALITY ENVIRONMENT DATA

CROSS-REFERENCE TO RELATED APPLICATIONS

This Application is a Section 371 National Stage Application of International Application No. PCT/FR2020/050438, filed Mar. 5, 2020, which is incorporated by reference in its entirety and published as WO 2020/178527 A1 on Sep. 10, 2020, not in English.

1. FIELD OF THE INVENTION

The invention relates to processing augmented reality or mixed virtual reality data, intended to be displayed for example by a holographic display.

2. PRIOR ART

Virtual reality glasses or headsets exist making it possible to display a mixed virtual-reality environment in the form of holograms integrating in the field of vision of the user. For example, the Microsoft® HoloLens headset, illustrated in FIG. 1, offers such a display. Such a headset is particularly equipped with sensors, for example cameras, making it possible for the user to gesturally interact in the virtual-reality environment, particularly on virtual objects of the environment projected by the headset or on virtual controls associated with physical objects, that is to say mixed reality objects.

The existing HoloLens type devices do not provide precise information to the user on the detection of the hand of the user. For example, basic visual information is displayed to the user in the form of a pad placed in the centre of the field of vision of the user, indicating that a hand is detected and may therefore manipulate an object. The user has no information concerning which hand is detected (right, or left, or both), or where this hand is detected.

Existing devices provide visual feedback on a screen relating to the detection of the hand of the user. For example, document US2012/0157203 proposes a gaming system wherein the hand of the user (or even their two hands) is(are) detected and displayed on a screen by means of a visual signal according to this detection. In particular, the representation of the hand detected takes the form of a corresponding hand (respectively right or left).

Nevertheless, as soon as the hand of the user leaves the display area, the user no longer has any information on the position of their hand, or on its detection. Furthermore, the visual representation of the hand provided to the user remains approximative as for its position in the virtual-reality environment.

Therefore, there is a need to improve the prior art.

3. DESCRIPTION OF THE INVENTION

The invention improves the prior art. To this end, it relates to a method for processing virtual-reality environment data. Such a method comprises detecting at least one part of the body of a user of the virtual-reality environment, said part of the body of the user being capable of interacting with at least one object of the virtual-reality environment, and generating at least one sound signal, the sound signal being according to at least one feature relating to the at least one detected part of the body of the user of the virtual-reality environment.

According to the invention, the method for processing virtual-reality environment data thus makes it possible following the detection of a part of the body of a user to generate a sound signal making it possible to inform the user of such a detection. For example, when the part of the body of the user corresponds to one of their hands, the information indicating to the user that their hand is detected is no longer dependent on the field for displaying the virtual environment data.

In particular, when the system implementing the virtual-reality environment comprises a space for detecting interactions and a space for reproducing the virtual-reality environment that are different, the method according to the invention makes it possible to be able to detect a part of the body of the user even if this part of the body is no longer in the reproduction space, while it may also interact in the virtual-reality environment. The method according to the invention thus makes it possible to overcome the drawbacks of the prior art wherein the detection of a hand of the user is only reproduced for the user by a visual signal.

According to a particular embodiment of the invention, the sound signal is reproduced for the user as long as the at least one part of the body is detected.

According to this particular embodiment of the invention, when the part of the body of the user is no longer detected by the system implementing the virtual-reality environment, i.e. as soon as the part of the body of the user leaves the detection space, the sound signal is interrupted.

The user is thus informed as soon as the part of the body is no longer detected by the system.

According to another particular embodiment of the invention, the sound signal generated depends on the position of the part of the body detected in relation to an element of the virtual-reality environment or in relation to another part of the body of the user detected.

For example, according to one variant, the sound signal depends on the distance between the part of the body detected and an object of the virtual-reality environment. For example, the sound signal is according to the distance between a hand of the user and an element, for example an object, displayed in the virtual-reality environment.

According to another variant, the sound signal depends on the distance between the part of the body detected and a real element reproduced in the virtual-reality environment. For example, if the user is moving, the sound signal depends on the distance between the user and a physical object of the environment.

According to yet another variant, the sound signal depends on the distance between the part of the body detected and another part of the body of the user, for example the head of the user when the virtual reality system is implemented by means of a holographic projection headset.

According to another particular embodiment of the invention, the frequency of the sound signal depends on the distance between the part of the body detected in relation to an element of the virtual-reality environment or in relation to another part of the body of the user detected. The sound signal is thus higher or lower according to the distance between the part of the body detected in relation to an element of the virtual-reality environment or in relation to another part of the body of the user detected.

For example, according to this particular embodiment of the invention, the frequency is high when the part of the body detected is close to an element of the virtual-reality environment and low when the part of the body detected is distant from an element of the virtual-reality environment, or vice versa. According to another example, when the part of the body detected moves closer to an element of the virtual-reality environment, the frequency of the sound generated increases and when the part of the body detected moves away from the element, the frequency of the sound generated decreases.

According to another particular embodiment of the invention, the generation of the sound signal is according to a left or right side of the part of the body of the user detected. According to this particular embodiment of the invention, when the part of the body detected is for example a hand, the user is thus informed according to the type of sound signal or to the rendering of the sound signal, whether it is the right or left hand.

According to another particular embodiment of the invention, the generation of the sound signal according to the detection of the at least one part of the body of a user of the virtual-reality environment comprises generating a spatialised audio signal. According to this particular embodiment of the invention, in addition to the information for detecting the part of the body, the user is informed of the location of the part of the body detected in the virtual-reality environment.

According to another particular embodiment of the invention, the sound signal is a binaural signal the sound source of which is placed at the position at which the part of the body of the user has been detected.

According to another particular embodiment of the invention, the sound signal comprises two channels, one channel of the two channels being intended for the right ear, and another channel of the two channels being intended for the left ear, one channel or the two channels of the sound signal being transmitted to the corresponding ear when the part of the body of the user or another part of the body of the user is detected on the side of the corresponding ear.

According to another particular embodiment of the invention, the processing method further comprises modifying the sound signal during an interaction of the part of the body detected with an element of the virtual-reality environment. This particular embodiment of the invention makes it possible to limit the interaction errors, for example by informing the user of the correct or incorrect gripping of a manipulatable object of the virtual-reality environment.

According to another particular embodiment of the invention, the processing method further comprises reproducing a visual signal representative of the detection of said part of the body of the user in the virtual-reality environment.

According to another particular embodiment of the invention, the virtual-reality environment is reproduced by holographic projection.

The invention also relates to a device for processing virtual-reality environment data configured to implement the processing method according to any one of the particular embodiments of the invention described above. Such a device comprises a processing unit comprising a processor and a memory operationally coupled to the processing unit, the processing unit and the memory being configured to implement the method for processing data according to any one of the particular embodiments of the invention described above.

According to a particular embodiment of the invention, such a device is included in a terminal.

The invention also relates to a computer program including instructions for implementing the data processing method according to any one of the particular embodiments previously described, when said program is executed by a processor. Such a program may use any programming language. It may be downloaded from a communication network and/or saved on a computer-readable medium. This program may use any programming language, and be in the form of source code, object code, or byte code between source code and object code, such as in a partially compiled form, or in any other desirable form.

According to another aspect, a recording medium or computer-readable information medium is proposed, which comprises instructions of a computer program such as mentioned above. The recording media mentioned above may be any entity or device capable of storing the program. For example, the medium may include a storage medium, such as a memory of the Read-Only Memory (ROM) type, for example a CD-ROM or a microelectronic circuit ROM, a flash memory mounted on a removable storage medium, such as a USB key, or also a magnetic mass memory of Hard-Disk Drive (HDD) or Solid-State Drive (SSD) type, or a combination of memories operating according to one or more data recording technologies. On the other hand, the recording media may correspond to a transmissible medium such as an electrical or optical signal, which may be routed via an electrical or optical cable, by radio or by other means. In particular, the computer program proposed may be downloaded on an Internet-type network.

Alternatively, the recording media may correspond to an integrated circuit wherein the program is incorporated, the circuit being adapted to execute or to be used in the execution of the method in question.

The method for processing data according to the invention may therefore be implemented in various ways, particularly in hardware form or in software form, or be implemented in the form of a combination of hardware and software elements.

4. LIST OF FIGURES

Figure 2:
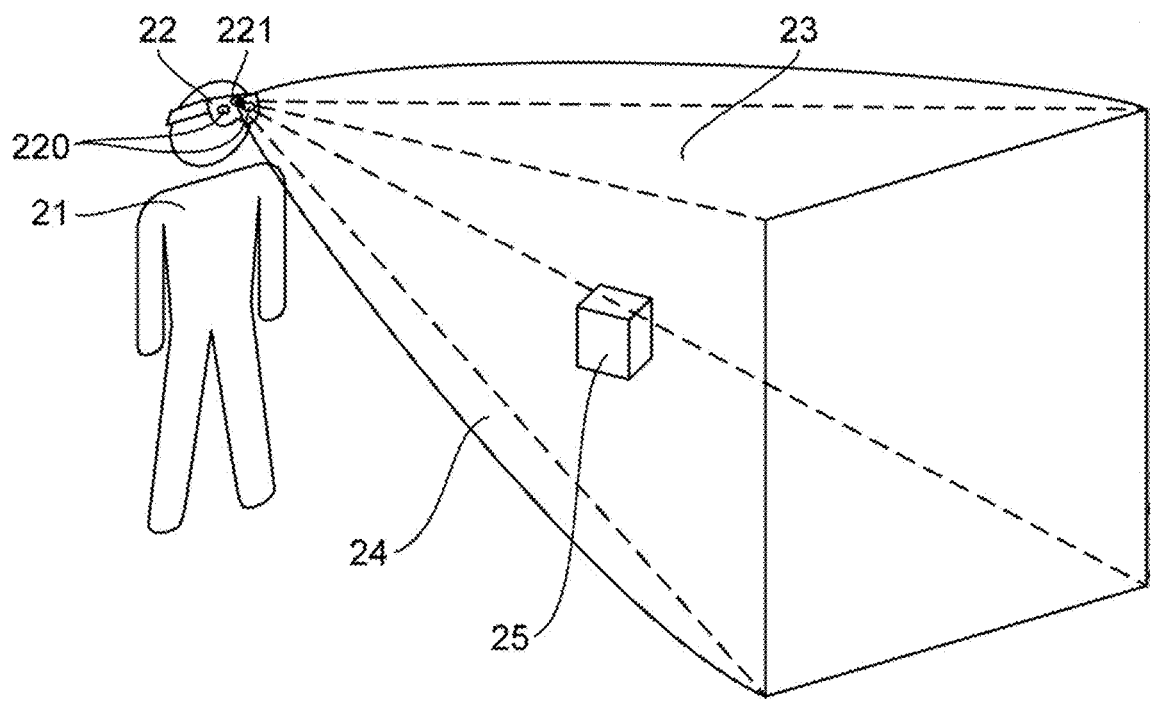
Figure 3:
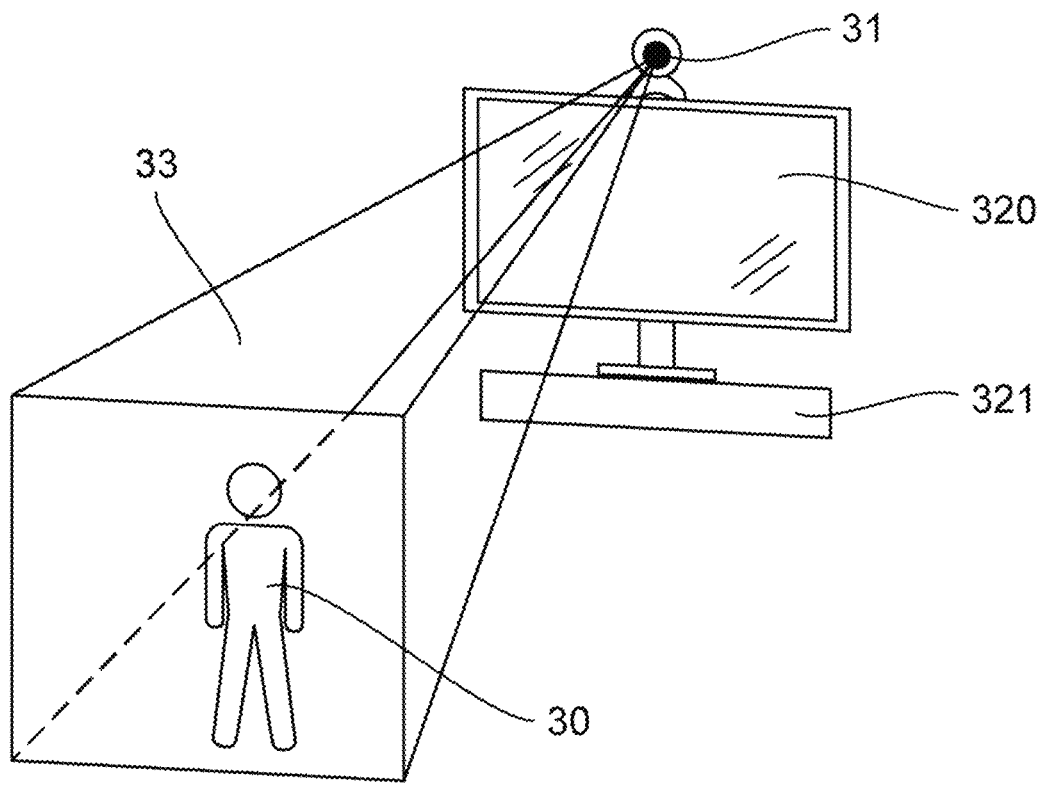
Figure 4:
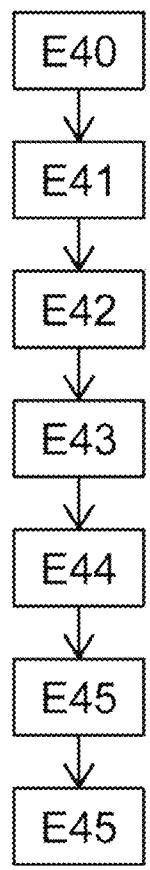
Figure 5:
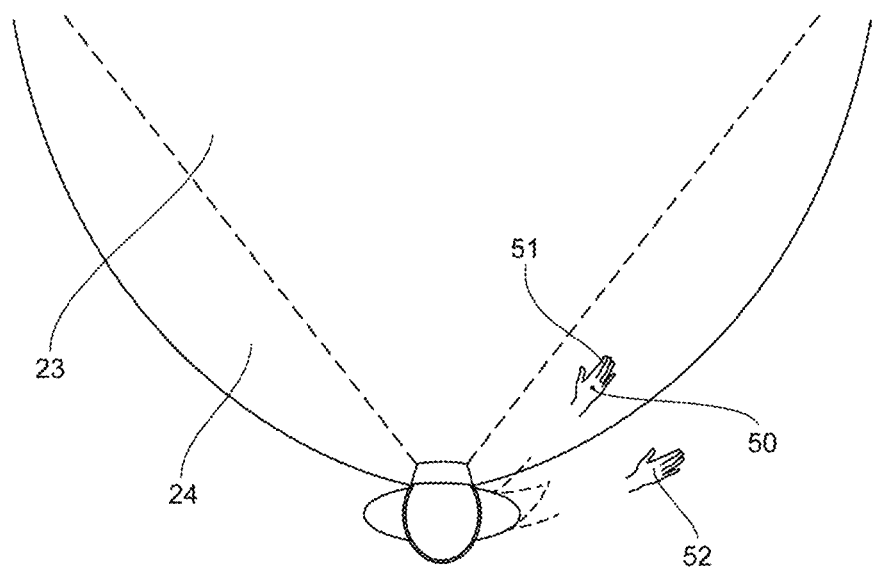
Figure 6:
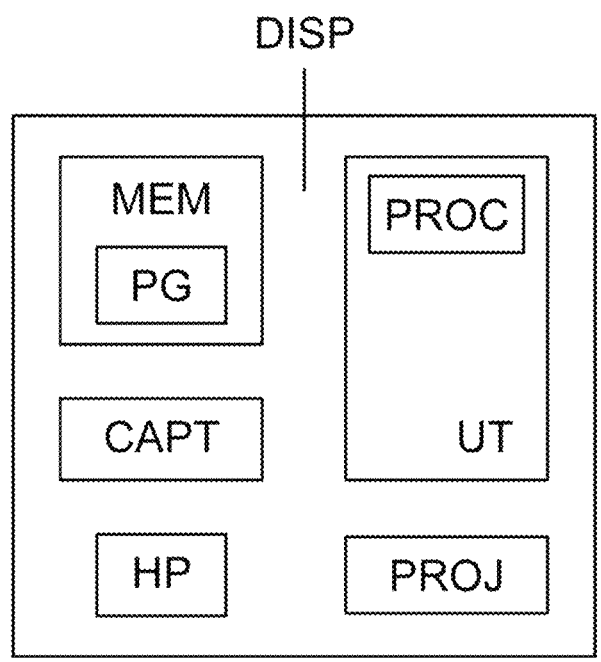

Other features and advantages of the invention will become more apparent upon reading the following description of a particular embodiment, given by way of simple illustrative and non-limiting example, and the appended figures, wherein:

FIG. 1 illustrates an example of a virtual reality headset using a holographic projection, FIG. 2 illustrates an example of an environment for implementing the invention according to a particular embodiment of the invention, FIG. 3 illustrates an example of an environment for implementing the invention according to another particular embodiment of the invention, FIG. 4 illustrates steps of the method for processing virtual-reality environment data according to a particular embodiment of the invention, FIG. 5 illustrates a visual representation of a spatialisation of the sound signal generated according to a particular embodiment of the invention, FIG. 6 schematically illustrates the structure of a device for processing virtual-reality environment data according to one embodiment.

5. DESCRIPTION OF ONE EMBODIMENT OF THE INVENTION 5.1 General Principle

The general principle of the invention aims to improve virtual-reality environment implementation systems by providing a user of such systems with information relating to the detection of parts of their body capable of interacting in the virtual-reality environment. The invention therefore makes it possible to avoid manipulation errors.

For this, during the detection by the system for implementing the virtual-reality environment of a part of the body of the user capable of interacting in the virtual-reality environment (for example a hand, a foot, etc.), a sound signal is generated. Advantageously, such a sound signal is according to this detection. Thus, the sound signal itself or even its reproduction depend on the location of the part of the body detected in the environment, or even the part of the body detected itself.

5.2 Examples of Implementation

FIG. 2 illustrates an example of an environment for implementing the invention according to a particular embodiment of the invention. According to this particular embodiment of the invention, the virtual-reality environment is implemented by means of a holographic projection headset, for example the Microsoft® HoloLens© headset.

In FIG. 2, a user (21) is schematically illustrated wearing a holographic projection headset (22). In the example illustrated, the holographic projection headset (22) comprises a projection device (220) defining a projection space (23) and a detection device (221) defining a detection space (24).

For example, the projection device (220) comprises two screens (not shown) for holographic projection placed respectively in front of the right eye and the left eye of the user (21) of the headset, as well as projectors (not shown) for projecting a virtual-reality environment, for example a virtual object (25).

Such a projection device thus defines a projection space (23) of the virtual-reality environment, illustrated by dotted lines in FIG. 2. Such a projection space corresponds to a space wherein the user (21) has the impression that the virtual objects and the virtual-reality environment are displayed. In the example of embodiment described here, the projection space (23) is limited by the field of vision of the holographic projection headset (22).

The detection device (221) comprises for example a 2D camera and depth sensors (not shown), or even a 2D+depth camera. According to the embodiment illustrated in FIG. 2, when a part of the body of the user of the holographic projection headset (22), for example a hand, is in the detection space (24) (defined as a solid line in FIG. 2), this part of the body is detected by the detection device and may manipulate virtual objects projected in the virtual-reality environment.

The detection device and the projection device are coupled to a processing unit of the headset (22) (not shown) that is configured to process the virtual-reality environment data, i.e. the 2D or 3D data of the scene to be projected by the projection device, and the data captured by the detection device, for example a part of the body of the user to be detected and/or elements of the real environment of the user.

As illustrated in FIG. 2, the projection space (23) and the detection space (24) may be different. For example, with reference to FIG. 2, the detection space is wider than the projection space.

Thus it appears that a part of the body of the user (21) may be detected in the detection space (24) but that it is not visible by the user in the projection space (23).

FIG. 3 illustrates an example of an environment for implementing the invention according to another particular embodiment of the invention. According to this other particular embodiment of the invention, the virtual-reality environment is implemented by means of a processing unit (321) processing the virtual-reality environment data, and communicated with a screen (320) used to display the virtual-reality environment, and a detection device (31), for example a camera, to detect interactions of the user (30) with the virtual-reality environment displayed on the screen (320).

The detection device (31) defines a detection space (33) inside of which a part of the body of the user (30) may be detected to interact with the virtual-reality environment reproduced on the screen (320).

It appears that according to the example described here, the projection space of the virtual-reality environment (defined by the screen 320) is completely different from the detection space, so that the user has no information that their hand, for example, is detected to interact with the virtual-reality environment displayed on the screen (320). It is possible to display on the screen a visual representation indicating to the user that their hand is indeed detected in the detection space, for example as in document US2012/0157203. However, such a visual representation only offers limited information to the user as for the position of their hand in the virtual-reality environment. In particular, in the example described here, the projection space and the detection space are completely disjointed, so that it is not easy for the user to have a good perception of the position of their hand in relation to the objects of the virtual-reality environment.

FIG. 4 illustrates steps of the method for processing virtual-reality environment data according to a particular embodiment of the invention. The method for processing virtual-reality environment data is described here with the aid of the example described in relation to FIG. 2. Such a method comprises detecting at least one part of the body of a user of the virtual-reality environment, said part of the body of the user being capable of interacting with at least one object of the virtual-reality environment, and generating at least one sound signal according to the detection of at least one part of the body of the user of the virtual-reality environment. The sound signal is according to at least one feature relating to the at least one detected part of the body of the user of the virtual-reality environment.

However, the method may also be implemented according to the example described in relation to FIG. 3, or with any other system capable of implementing and of restoring a virtual-reality environment.

A virtual-reality environment is projected (E40) by a device for implementing a virtual-reality environment, such as a holographic headset, in a projection space. For example, with reference to FIG. 2, a virtual object (25) is projected in the projection space (23).

The device for implementing a virtual-reality environment subsequently implements the detection (E41) in the detection space (24) of at least one part of the body of the user of the virtual-reality environment. The part of the body of the user to be detected is a part of the body capable of interacting with at least one object of the virtual-reality environment. For example, it may be a hand, or both hands, a foot or both feet. For greater simplicity, subsequently, it is considered that here it is a hand of the user.

The part of the body of the user to be detected depends on the virtual reality application wherein the method is implemented, and in particular possible interactions in the projected environment.

When the hand of the user is detected, a monitoring of the hand is performed as long as the hand is detected in the detection space (24) of the device. During this monitoring, the 3D coordinates of the hand in the projection space are determined by the implementation device.

At least one feature relating to this detection is subsequently determined (E42). For example, it may be the detected position of the hand in relation to an element of the virtual-reality environment or in relation to another part of the body of the user detected, or even of the type of the part of the body detected (hand, foot, left hand, right hand, etc.).

According to a particular embodiment of the invention, the determined feature corresponds to the 3D coordinates in the space for projecting the part of the body detected.

According to another particular embodiment of the invention, a distance is determined between the hand detected and the user. According to the example described here, the location of the user in the projection space is determined as the origin of the frame of reference of the projection space, corresponding to the head of the user since the projection device is worn by the user.

According to another particular embodiment of the invention, a distance is determined between the detected position of the hand and a particular virtual object projected in the projection space.

According to another particular embodiment of the invention, it is determined whether the hand detected is a left hand or a right hand.

According to another particular embodiment of the invention, a plurality of parts of the body of the user may be detected, for example both hands may be detected. In this case, the preceding steps of detecting/monitoring and determining a feature are implemented for each of the parts of the body detected.

A sound signal is subsequently generated (E43) according to the feature relating to the detection determined.

According to a particular embodiment of the invention, the frequency of the sound signal is adapted according to the distance determined between the hand detected and the user or the distance determined between the detected position of the hand and a particular virtual object projected in the projection space. For example, the frequency of the sound signal is high when the hand moves closer to the user or to the object. On the contrary, the frequency of the sound signal is low when the hand moves away from the user or from the object.

According to another particular embodiment of the invention, the sound signal is different depending on whether it is a left part of the body of the user or a right part of the body of the user that is detected. Thus, the user may differentiate whether it is their left hand that is detected or whether it is their right hand that is detected. In addition, when both hands are capable of interacting with the virtual-reality environment, two different sound signals and therefore distinguishable by the user are generated.

According to another particular embodiment of the invention, the generation of the sound signal depends on the position of the hand detected in the projection space. In this case, the sound signal generated is a spatialised audio sound. The spatialisation of the sound signal thus makes it possible to provide to the user information relating to the position of the hand detected.

For example, the spatialisation of the sound may be carried out simply, on a stereophonic mode. According to this example, the sound signal generated comprises two channels: a channel intended for the left ear and a channel intended for the right ear. Depending on whether the hand is detected on the right or on the left of the user, the right or left channel of the sound signal is transmitted to the corresponding ear.

When a plurality of parts of the body of the user are detected, if they are detected on the same side, the corresponding signals are transmitted via the same channel. If they are detected on different sides, the signals corresponding to the parts detected are transmitted on the corresponding channel on the side where they have been detected.

According to another example, the spatialisation of the sound signal is implemented by the generation of a binaural signal the sound source of which is placed at the position at which the part of the body of the user has been detected. For example, FIG. 5 illustrates a visual representation of such a spatialisation of the sound signal, in the case of a virtual-reality environment implemented by a holographic headset. FIG. 5 shows via a schematic view from above, the user (21) equipped with a holographic headset (22) projecting a virtual-reality environment in the projection space (23). The detection space (24) of the projection device is also illustrated. According to the example illustrated in FIG. 5, the hand (51) of the user is detected in the detection space (24) but outside of the projection space (23), so that the user does not see their hand (51) when they view the virtual-reality environment via the holographic device (22). According to the particular embodiment of the invention, when the binaural sound signal is reproduced, the user (21) has the impression that the sound comes from the place (50) corresponding to the location at which the hand has been detected.

With reference to FIG. 4, the sound signal is reproduced (E44) as it is generated. The reproduction may be carried out via loudspeakers placed on the projection device or placed in the physical environment of the user and in communication with the projection device.

According to a particular embodiment of the invention, the sound signal is reproduced for the user as long as the hand is detected. For example, with reference to FIG. 5, when the hand leaves (52) the detection space (24), the reproduction and the generation of the sound signal are interrupted.

Alternatively, during the reproduction of the sound signal, in addition a visual signal indicating the detection of the part of the body of the user may also be displayed (E44) to the user, in the projection space. This visual signal may be displayed at the place for detecting the part of the body if it is detected in the projection space. Alternatively, the visual signal may be displayed in a space of the projection space reserved for displaying information such as a menu, interaction controls, etc.

The visual signal may also be representative of information additional to the detection of the part of the body. For example, it may indicate the side of the part of the body detected (left hand, right hand, a state for gripping an object, a state detected for opening/closing the hand in the case where actions in the virtual-reality environment are capable of being controlled by a change of state of the hand, etc.).

According to one particular embodiment of the invention, when the user interacts (E45) with an object of the virtual-reality environment, the sound signal is modified (E46) according to this interaction. For example, the sound signal may change when the user catches an object or opens a door.

The sound signal may be modified differently depending on whether the interaction is performed correctly by the user. For example, when the user catches an object, for example by closing the thumb and the index finger according to the HoloLens technique, if the closed state of the hand is detected, a new sound signal is generated and reproduced. This new sound signal is different from the signal generated during the detection of the hand without gripping an object. Thus, the user is informed of the correct gripping of the object.

In the same way, when the user manipulates the object and a change of state of the hand is detected, for example an opening of the thumb and the index finger, the sound signal is modified again. The user is thus informed of the change, and may reposition their fingers correctly if the change of state detected by the system was not due to the user. Likewise, if the user opens the hand to release the object, but that the sound signal is not modified, they are thus informed, due to the absence of modification of the sound signal, that the change of state of their hand has not been taken into account correctly by the system.

This particular embodiment of the invention thus makes it possible to avoid manipulation errors during interactions in the virtual-reality environment.

Various particular embodiments of the invention have been described above. These various particular embodiments of the invention may be implemented alone or in combination with one another.

FIG. 6 illustrates the simplified structure of a device DISP for processing virtual-reality environment data according to a particular embodiment of the invention. Such a device is configured to implement the method for processing virtual-reality data according to any one of the previously described embodiments.

In the non-limiting example illustrated in FIG. 6, the device DISP comprises a memory MEM, a processing unit UT, equipped for example with a processor PROC, and controlled by the computer program PG stored in memory MEM. The computer program PG comprises instructions for implementing the steps of the method for processing data such as previously described, when the program is executed by the processor PROC.

Upon initialisation, the code instructions of the computer program PG are for example loaded into a memory RAM before being executed by the processor PROC. The processor PROC of the processing unit UT particularly implements the method for processing data according to any one of the embodiments described in relation to FIG. 4 according to the instructions of the computer program PG.

For this, the device DISP comprises a detection device CAPT configured to detect at least one part of the body of a user in a detection space of the virtual-reality environment.

The device DISP also comprises a projection device PROJ making it possible to visually reproduce the virtual-reality environment for the user, for example via a holographic projection technique or via a display on a 2D or 3D screen with glasses or without glasses.

The device DISP also comprises an audio reproduction device HP configured to reproduce a sound signal generated according to the detection of the at least one part of the body of the user.

According to a particular embodiment of the invention, the device DISP previously described is included in a terminal, for example a virtual reality headset.

The architecture of the device DISP illustrated in FIG. 6 however is not limiting. The device DISP may for example be operationally coupled to the projection system PROJ, and be implemented in the form of a device different from the projection system PROJ.

The device DISP may for example be operationally coupled to the audio reproduction device HP, and be implemented in the form of a device different from the audio reproduction device HP.

The device DISP may for example be operationally coupled to the detection device CAPT, and be implemented in the form of a device different from the detection device CAPT.

In addition, the device DISP may be implemented on various types of platform, such as a computer (for example of PC or laptop type) or a computer network, a smartphone, a tablet, or another apparatus including a processor operationally coupled to a memory, as well as, according to the embodiment selected, other associated hardware elements such as a network interface and a media reader for reading a removable storage medium and writing on such a medium (not shown in the figure).

The invention claimed is:

1. A processing method implemented by a processing device for processing virtual-reality environment data, comprising:
    detecting at least one part of a body of a user of a virtual-reality environment, said part of the body of the user being capable of interacting with at least one object of the virtual-reality environment; and
    generating at least one sound signal, the sound signal being according to at least one feature relating to the at least one detected part of the body of the user of the virtual-reality environment,
    wherein the virtual-reality environment comprises a detection space for detecting interactions and a projection space of the virtual-reality environment, which is different than the detection space, so that said part of the body of the user can be detected to interact in the detection space but is not visible to the user in the projection space of the virtual reality environment.

2. The processing method according to claim 1, further comprising reproducing the sound signal for the user as long as the at least one part of the body is detected.

3. The processing method according to claim 1, wherein the sound signal generated depends on a position of the part of the body detected in relation to an element of the virtual-reality environment or in relation to another part of the body of the user detected.

4. The processing method according to claim 3, wherein the sound signal has a frequency that depends on a distance between the part of the body detected in relation to an element of the virtual-reality environment or in relation to another part of the body of the user detected.

5. The processing method according to claim 1, wherein the generation of the sound signal is according to a left or right side of the part of the body of the user detected.

6. The processing method according to claim 1, wherein:
    the generation of the sound signal according to the detection of the at least one part of the body of the user of the virtual-reality environment comprises generating a spatialised audio signal.

7. The processing method according to claim 6, wherein the sound signal is a binaural signal having a sound source placed at the position at which the part of the body of the user has been detected.

8. The processing method according to claim 6, wherein the sound signal comprises two channels, one channel of the two channels being intended for the right ear, and another channel of the two channels being intended for the left ear, wherein the processing device transmits one of the two channels or the two channels of the sound signal to the corresponding ear when the part of the body of the user or another part of the body of the user is detected on the side of the corresponding ear.

9. The processing method according to claim 1, further comprising modifying the sound signal during an interaction of the part of the body detected with an element of the virtual-reality environment.

10. The processing method according to claim 1, further comprising reproducing a visual signal representative of the detection of said part of the body of the user in the virtual-reality environment.

11. The processing method according to claim 1, wherein the virtual-reality environment is reproduced by holographic projection.

12. A device for processing virtual-reality environment data, the device comprising:
 a processing unit, comprising a processor, and a memory operationally coupled to the processing unit, the processing unit and the memory being configured to processing virtual-reality environment data, by:
 detecting at least one part of a body of a user of a virtual-reality environment, said part of the body of the user being capable of interacting with at least one object of the virtual-reality environment; and
 generating at least one sound signal, the sound signal being according to at least one feature relating to the at least one detected part of the body of the user of the virtual-reality environment,
 wherein the virtual-reality environment comprises a detection space for detecting interactions and a projection space of the virtual-reality environment, which is different than the detection space, so that said part of the body of the user can be detected to interact in the detection space but is not visible to the user in the projection space of the virtual reality environment.

13. A terminal comprising:
 a control device for processing virtual-reality environment data, the device comprising:
 a processing unit, comprising a processor, and a memory operationally coupled to the processing unit, the processing unit and the memory being configured to process virtual-reality environment data, by:
 detecting at least one part of a body of a user of a virtual-reality environment, said part of the body of the user being capable of interacting with at least one object of the virtual-reality environment; and
 generating at least one sound signal, the sound signal being according to at least one feature relating to the at least one detected part of the body of the user of the virtual-reality environment,
 wherein the virtual-reality environment comprises a detection space for detecting interactions and a projection space of the virtual-reality environment, which is different than the detection space, so that said part of the body of the user can be detected to interact in the detection space but is not visible to the user in the projection space of the virtual reality environment.

14. A non-transitory computer-readable medium comprising a computer program stored thereon including instructions for implementing a method of processing virtual-reality environment data, when said program is executed by a processor, wherein the method comprises:
 detecting at least one part of a body of a user of a virtual-reality environment, said part of the body of the user being capable of interacting with at least one object of the virtual-reality environment; and
 generating at least one sound signal, the sound signal being according to at least one feature relating to the at least one detected part of the body of the user of the virtual-reality environment,
 wherein the virtual-reality environment comprises a detection space for detecting interactions and a projection space of the virtual-reality environment, which is different than the detection space, so that said part of the body of the user can be detected to interact in the detection space but is not visible to the user in the projection space of the virtual reality environment.

* * * * *